United States Patent
Flockhart et al.

(10) Patent No.: US 6,295,353 B1
(45) Date of Patent: Sep. 25, 2001

(54) ARRANGEMENT FOR EFFICIENTLY UPDATING STATUS INFORMATION OF A NETWORK CALL-ROUTING SYSTEM

(75) Inventors: Andrew D. Flockhart, Thornton, CO (US); Eugene P. Mathews, Barrington, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/167,852

(22) Filed: Oct. 7, 1998

(51) Int. Cl.$^7$ .................................................. H04M 3/00
(52) U.S. Cl. .......................... 379/265; 379/266; 379/221
(58) Field of Search ..................................... 379/265, 266, 379/309, 221, 67, 34; 370/270

(56) References Cited

U.S. PATENT DOCUMENTS

| | | | |
|---|---|---|---|
| 4,737,983 | 4/1988 | Frauenthal et al. ................... | 379/221 |
| 4,893,328 | * 1/1990 | Peacock ................................. | 379/67 |
| 5,291,552 | * 3/1994 | Kerrigan et al. ..................... | 379/266 |
| 5,299,259 | * 3/1994 | Otto ...................................... | 379/221 |
| 5,335,268 | * 8/1994 | Kelly et al. .......................... | 379/112 |
| 5,450,482 | * 9/1995 | Chen et al. .......................... | 379/207 |
| 5,452,350 | * 9/1995 | Reynolds et al. .................... | 379/220 |
| 5,465,286 | * 11/1995 | Clare et al. ........................... | 379/34 |
| 5,530,744 | 6/1996 | Charalambous et al. ............ | 379/265 |
| 5,590,188 | * 12/1996 | Crockett ............................... | 379/225 |
| 5,754,639 | * 5/1998 | Flockhart et al. .................... | 379/221 |

FOREIGN PATENT DOCUMENTS

WO 98 35509  8/1998  (EP) .............................. H04M/3/00

OTHER PUBLICATIONS

Zippy Grigonis, *The PBX Slayer Goes Multisite*, Computer Telephony, May 1998, p. 118.

F. Langlois, et al., "Dynamic Congestion Control In Circuit–Switched Telecommunications Networks", Teletraffic Congress, NL, Amsterdam, North Holland, vol. Congress 13, 1991, pp. 127–132.

* cited by examiner

*Primary Examiner*—Creighton Smith
*Assistant Examiner*—Benny Q. Tieu
(74) *Attorney, Agent, or Firm*—David Volejnicek

(57) ABSTRACT

Call centers (143–145) use an event-driven scheme (207) with a filter (366) to send status updates to an associated network call-routing system (150). The filter ensures that only minimal status changes are not reported to the network call-routing system. Each call center records (310) the status values (360–365) of different splits that it last sent to the call-routing system, and sends a new status update only when a status value of a split has changed (306) by the split's corresponding threshold amount (380–385). On the one hand, in large splits, the number of status-impacting events (such as call arrival, call serviced, call abandon, agent login/logout, etc.) is typically high, but the scale of the change in status effected by each of these events is minimal. On the other hand, in small splits, the number of status-impacting events is typically small but the scale of the change in status effected by each of these events is significant. Therefore, substantially each event at a small split with a small volume of events results in a status update being sent, whereas only a small minority of events at a large split with a high volume of events results in a status update being sent.

15 Claims, 3 Drawing Sheets

ARRANGEMENT FOR EFFICIENTLY UPDATING STATUS INFORMATION OF A NETWORK CALL-ROUTING SYSTEM

TECHNICAL FIELD

This invention relates to network call-routing systems.

BACKGROUND OF THE INVENTION

A network call-routing system, also referred to as a call router, controls the routing of incoming calls to a private (e.g., a company's) network of call centers. One of the principal objectives of a network call-routing system is to route each individual call to the call center in the network which presently offers the shortest call-answer waiting time. In order to achieve this objective, the network call-routing system must obtain status information from each of the call centers in the network on a continuing basis.

There are two commonly-used schemes for sending status updates to a network call-routing system: periodic updates, and event-driven updates. But periodic updates of status are almost never timely. No matter how frequently the updates are sent, there is always a likelihood that a routing decision will use incorrect, out-of-date, status information. And while event-driven updates are much more timely, they require excessive bandwidth and processing time for large call-volume applications. For example: it is not uncommon for as many as 10 update-triggering events to occur per second in a single split on a single busy switch. Therefore, neither scheme is very efficient or effective in all call-center scenarios, and both have the problem of requiring excessive bandwidth or processing time to achieve an acceptable level of accuracy of routing decisions.

SUMMARY OF THE INVENTION

This invention is directed to solving these and other problems and disadvantages of the art. Generally according to the invention, an event-driven scheme with a filter is used for sending status updates, where the filter ensures that minimal status changes are not reported to the network call-routing system. Accordingly, each call center keeps track of the status value or values that it last sent to the call-routing system, and sends a new status update only when a status value has changed by a corresponding threshold amount. An illustrative example of a status is the estimated wait time (EWT) in a call queue of calls arriving at the call center or one of its splits. On the one hand, in large splits, the number of events (such as call arrival, call serviced, call abandon, agent login/logout, etc.) is typically high, but the scale of the change in status effected by each of these events is minimal. On the other hand, in small splits, the number of events is typically small, but the scale of the change in status effected by each of these events is significant. According to the invention, therefore, each event at a small split with a small volume of events may result in a status update being sent, whereas only a small minority of events at a large split with a high volume of events may result in a status update being sent. The net result is that the routing system uses status information which is accurate to within the selected threshold, while significantly reducing the bandwidth and the processing time required for status updates.

Specifically according to the invention, there is presented an improved method, apparatus, and computer-readable medium containing software, for updating node status information of a call router that routes calls to ones of a plurality of call-processing nodes. A node is illustratively a call center, an automatic call distribution (ACD) system, or a call center split/skill. When a change in status of one of the nodes is detected, a determination is made of whether the change in the status of the one node since the last time that the status of the one node has been reported to the call router has reached a threshold amount. If the threshold amount has been reached, the changed status is reported to the call router. If the threshold amount has not been reached, the node forbears from reporting the status to the call router, until such time as the status change does reach the threshold amount.

Illustratively, detecting the change in status of the one node involves detecting occurrence of a status-impacting event at the one node. Then the determining of whether the change has reached the threshold amount involves computing the present value of the status using the detected event and determining whether a difference between the present value of the status of the one node and a value of the status at the one node that was last reported to the call router has reached the threshold amount. If so, occurrence of the status change is reported to the call router; if not, concurrence of the status change is not reported to the router. Preferably, the event impacts one of a plurality of splits that exist at the one node, and each split has a corresponding threshold associated therewith.

These and other features and advantages of the invention will become more apparent from the following description of an illustrative embodiment of the invention considered together with the drawing.

DETAILED DESCRIPTION

Figure 1:
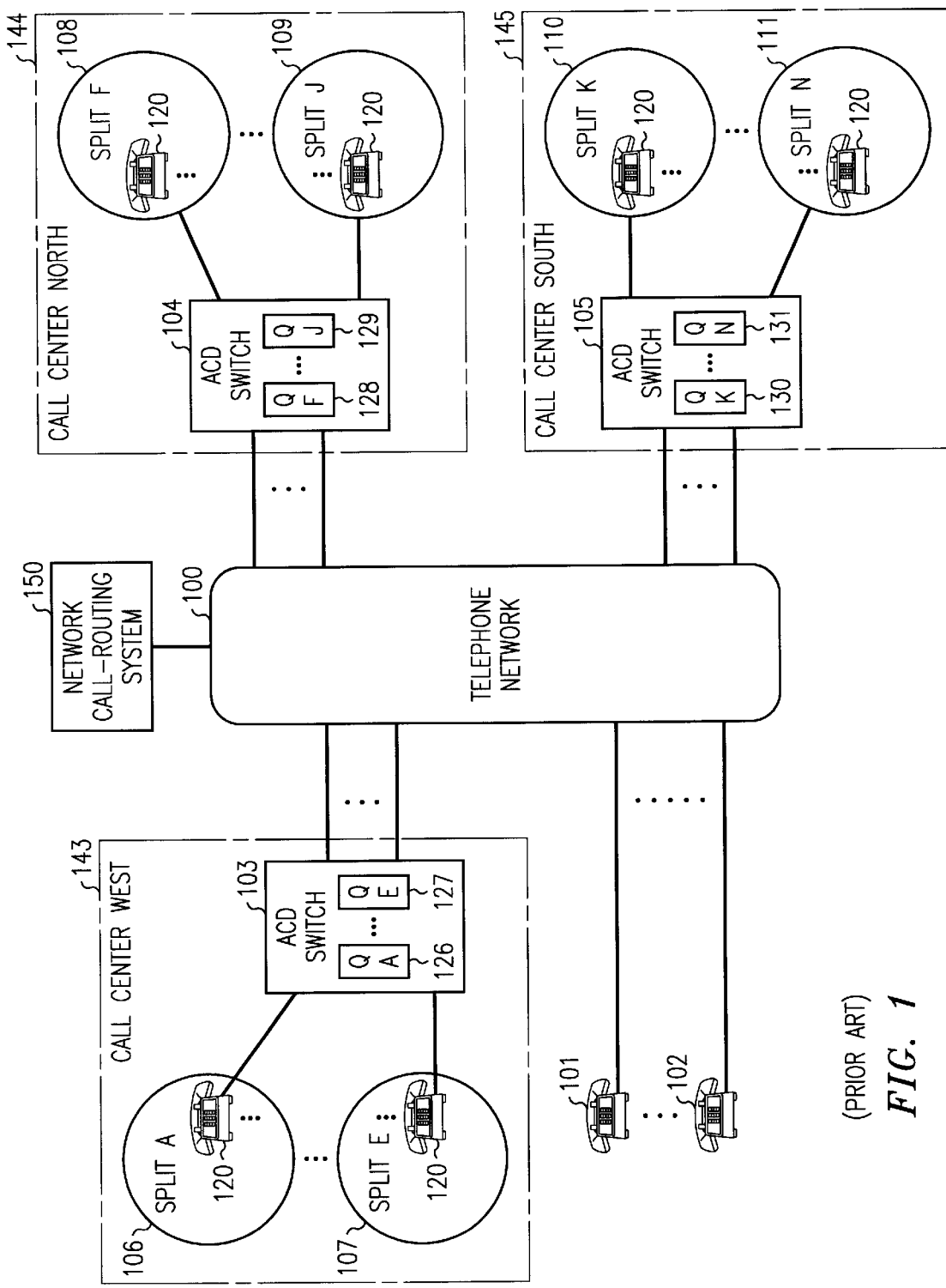
FIG. 1 is a block diagram of a telecommunications system that includes an illustrative embodiment of the invention.

FIG. 1 shows a conventional telecommunications system. In this illustrative example, the telecommunication system comprises a plurality—three, in this example—of networked call centers 143–145 respectively designated as "west", "north", and "south". Call centers 143–145 are interconnected with each other, and with telephones 101–102 of callers who are potential users of call centers 143–145, via a telephone network 100. Calls from telephones 101–102 are distributed between call centers 143–145 by a conventional network call-routing system 150. Call centers 143–145 send system 150 reports on their present status, and system 150 uses this information to route each call to the one of the call centers 143–145 where the call will be handled most expeditiously. Each call center 143–145 comprises an automatic call distribution (ACD) switch 103–105, respectively, and a plurality of agent position terminals 120, such as telephones. ACD switches 103–105 connect terminals 120 to telephone network 100. In each call center 143–145, the agents and their terminals 120 are divided into one or more splits 106–107, 108–109, and 110–111, respectively, and the respective ACD switch 103–105 defines a waiting-call queue 126–127, 128–129, and 130–131, for each of the splits 106–107, 108–109, and 110–111, respectively. Additionally, any one or more of the queues 126–131 may comprise a plurality of priority queues, each for holding waiting calls of a different priority (not shown).

Figure 2:
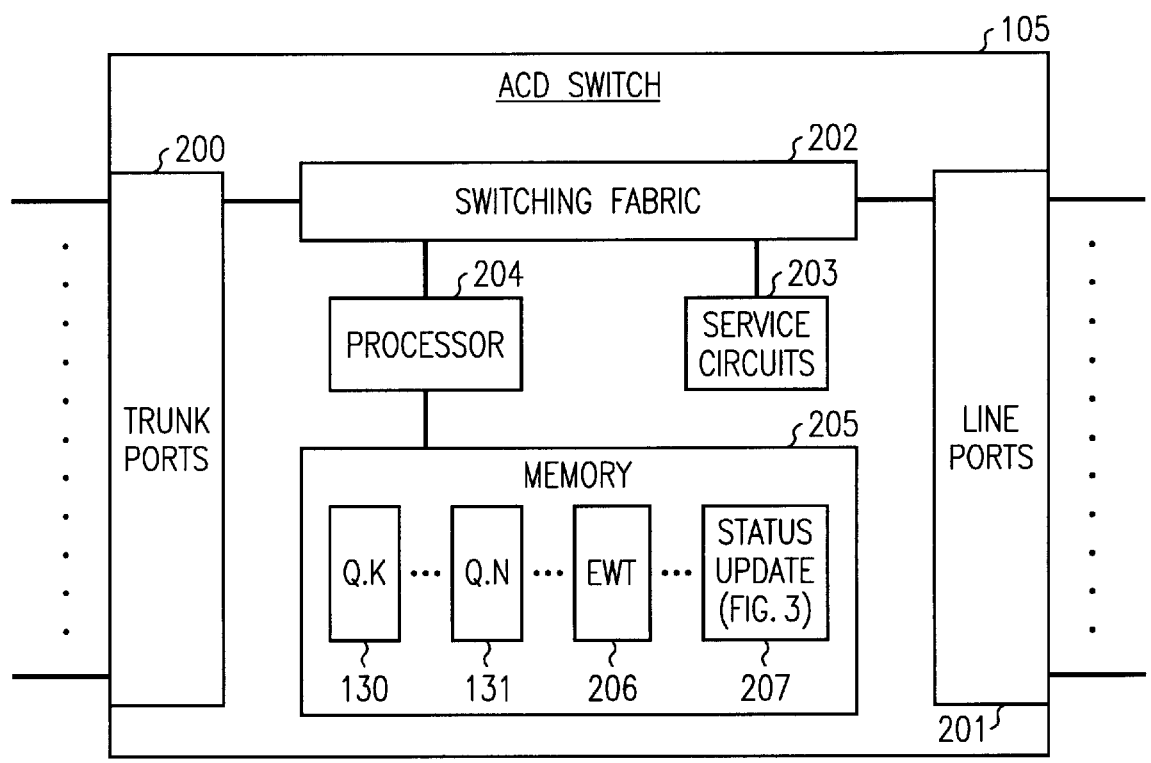
FIG. 2 is a block diagram of an automatic call distribution (ACD) switch of a call center of the telecommunications system of FIG. 1.

FIG. 2 shows ACD switch 105 in greater detail. ACD switch 105 is representative of all ACD switches 103–105. ACD switch 105 conventionally includes trunk ports 200 for connecting ACD switch 105 to telephone network 100; line ports 201 for connecting ACD switch 105 to agent terminals 120; service circuits 203 that provide various services, such as tone generators, announcement generators, hold circuits, conference circuits, modems, etc.; a switching fabric 202 that selectively interconnects ports 200, ports 201, and service circuits 203; a processor 204 that controls switching fabric 202 and other elements of ACD switch 105; and a memory 205 which holds control programs and data which processor 204 executes and uses to control the operation of ACD switch 105. Memory 205 includes queues 130–131 for splits 110–111, respectively, and an estimated waiting time (EWT) function 206 which computes the amount of time that a call is likely to spend in any one of the queues 130–131 before being taken out of that queue, e.g., before being connected to an agent's terminal 120. Switch 105 is illustratively the AT&T Definity® ACD private branch exchange (PBX). EWT function 206 may be any suitable EWT function, but is preferably the EWT function described in U.S. Pat. No. 5,506,898.

Figure 3:
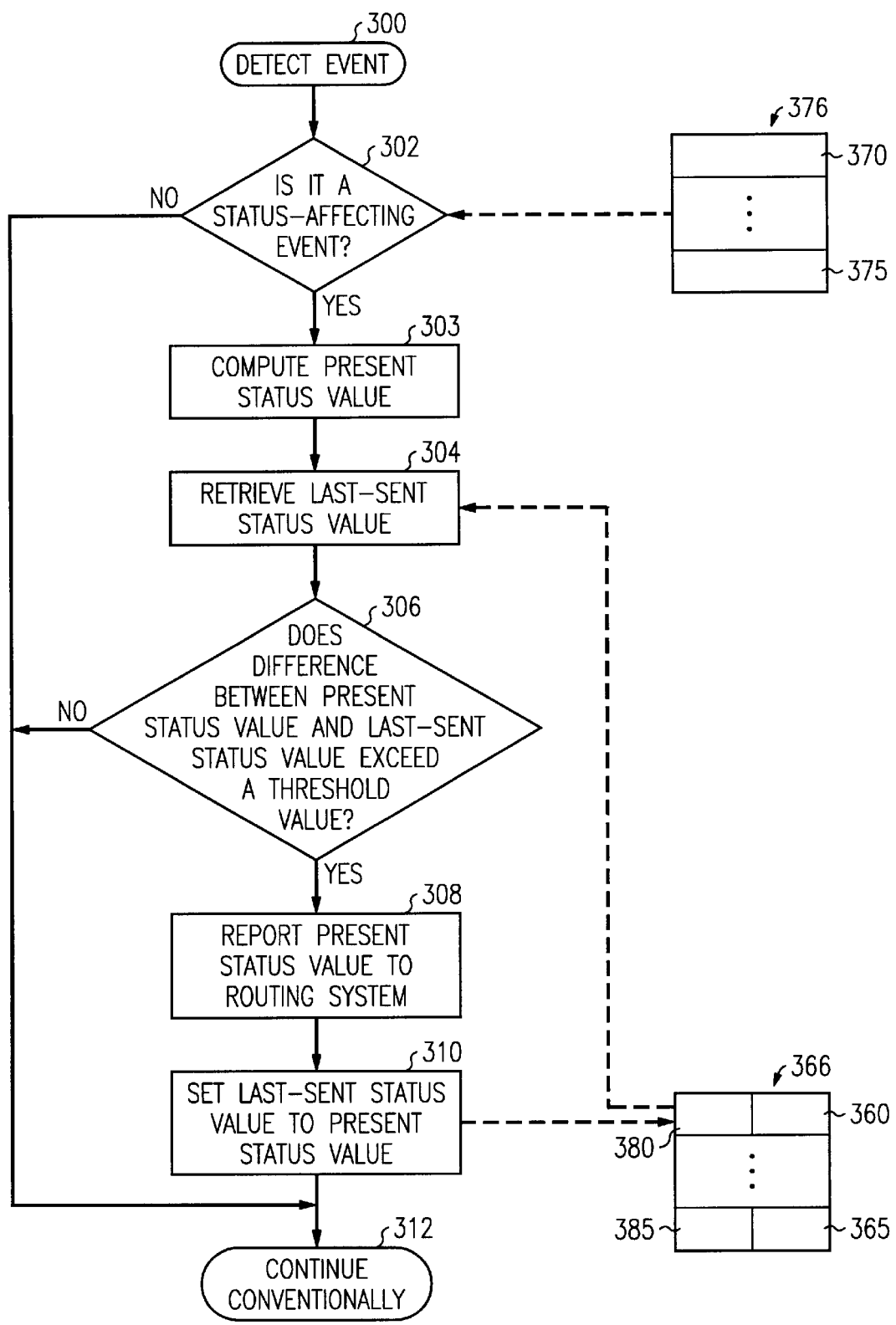
FIG. 3 is a functional flow diagram of a status-update function of the ACD switch of FIG. 2.

According to the invention, memory 205 includes an improved status update function 207, which is shown in greater detail in FIG. 3. Alternatively, function 207 may be stored in a portable memory, such as a magnetic disk or a CD-ROM, or may be implemented in hardware or in an adjunct processor.

Execution of function 207 by processor 204 commences when processor 204 detects occurrence of an event in ACD switch 105, at step 300. An event can be any action or state change. Processor 204 checks whether the event is a status-affecting event, at step 302, by consulting an administratively-programmed list 376 of status-affecting events 370–375 in memory 205. A status-affecting event can be any event having a bearing on which one of the call centers 143–145 network call-routing system 150 should route a call to, e.g., call arrival, call serviced, call abandon, agent login/logout, etc. If the event is not status-affecting, processor 204 continues conventionally, at step 312, e.g., by recording the event in a call-management system (not shown). If the event is status affecting, processor 204 recomputes the status, i.e., uses the event to compute a present status value, at step 303. Illustratively, processor 204 uses the occurred event in EWT function 206 to compute the present estimated wait time for the affected one of splits 110–111. To determine if a status update needs to be reported to network call-routing system 150, processor 204 retrieves the last-sent status value from a list 366 of last-sent status values 360–365 each corresponding to a different split 110–111, at step 304, and compares the present status value against the last-sent status value to determine if their difference exceeds a predetermined threshold, at step 306. Processor 204 obtains the threshold value from a list 366 of threshold values 380–385 each corresponding to a different split 110–111. Alternatively, all splits may have the same one threshold value.

If the difference in the last-sent and present status values has not reached the threshold value, the change in status is not to be reported to system 150 at this time, and so processor proceeds to step 312 to continue with conventional operation. If the threshold value has been reached, processor 204 promptly sends a status-update message reporting the status change to system 150, at step 308. System 150 uses this information to update its status of the corresponding one of the splits of the one of the call centers 143–145 from which the message was received. Following step 308, processor 204 sets the corresponding one of the last-sent status values 360–365 in list 366 to the present status value, at step 310. Processor 204 then continues with conventional operations, at step 312.

Of course, various changes and modifications to the illustrative embodiment described above will be apparent to those skilled in the art. For example, status information can take many forms other than EWT, such as: age of oldest-call waiting, average speed of answer, service level, number of calls in queue, number of agents available, time in queue of most-idle agent, occupancy of least-occupied available agent, skill level of most-skilled available agent, etc. Also, status threshold values may be administered on a per-call center, per-ACD, per-skill, per-call type, etc., basis. Alternatively, threshold values may be set for numbers of specific status-effecting events, as opposed to the status itself, and changes in the amounts of the events may be reported to the call-router for use in recomputing the status of the corresponding node at the call router. These changes and modifications can be made without departing from the spirit and the scope of the invention and without diminishing its attendant advantages. It is therefore intended that such changes and modifications be covered by the following claims.

What is claimed is:

1. A method of updating node status information of a call router that routes calls to ones of a plurality of call processing nodes, comprising:

a call processing node sending to the call router status-update messages and not the calls to affect the call router's routing of the calls to the ones of the nodes;

the node detecting a change in its status;

in response, the node determining whether the change in its status since a last time that a change in its status has been reported to the call router has reached a threshold amount;

in response to determining that the threshold amount has been reached, the node sending one of said status-update messages reporting the change in its status to the call router; and in response to determining that the threshold amount has not been reached, the node forbearing from reporting the change in its status to the call router until such time as the threshold amount of change in its status is reached.

2. The method of claim 1 wherein:

detecting a change comprises detecting occurrence of status-impacting event at the node, and computing a present value of the status of the node;

determining whether the change has reached a threshold amount comprises determining whether a difference between the present status value and a value of the status of the node last reported to the call router has reached the threshold amount;

sending one of said status-update messages comprises sending the one of said status-update messages reporting the occurrence of the change to the call router; and forbearing comprises not reporting the occurrence of change to the router.

3. The method of claim 1 wherein:

detecting a change comprises
    detecting occurrence of an event impacting the status of one of the plurality of nodes, and
    computing a present value of the status of the one node;

determining whether the change has reached a threshold amount comprises
    determining whether a difference between the present status value and a value of the status of the one node last reported to the call router has reached a threshold amount corresponding to the one node;

sending one of said status-update messages comprises
    sending one of said status-update messages reporting the occurrence of the status change corresponding to the one node to the call router; and forbearing comprises
    not reporting the occurrence of the status change of the one node to the call router until such time as the threshold amount of status change corresponding to the one node is reached.

4. The method of claim 1 wherein
the node comprises a call center.

5. The method of claim 1 wherein
the node comprises an automatic call distribution system.

6. The method of claim 1 wherein
the node comprises a split or a skill of a call center.

7. The method of claim 1 wherein
the change in status an occurrence of any one of a plurality of events that affect whether or not the call router a call to the one.

8. An apparatus that performs the method of claim 1 or 2 or 3 or 4 or 5 or 6 or 7.

9. A computer-readable medium containing software which, when executed in a processor, causes the processor to perform the method of claim 1 or 2 or 3 or 4 or 5 or 6 or 7.

10. A method comprising:

a network call routing each call through a communications network to one of plurality of call processing nodes exclusive of the network call router, without intermediary of another one of the plurality of nodes;

each said node responsive to receipt of the call routed thereto, by processing said received call at said node;

the nodes communicating with the network call router by sending status-update messages and not the calls to the network call router to affect the network call router's routing of the calls to the nodes;

one of the nodes detecting a change in its status;

in response, the one node determining whether the change in its status since a last time that a change in its status has been reported to the network call router has reached a threshold amount;

in response to determining that the threshold amount has been reached, the one node sending one of said status-update messages reporting the change in its status to the network call router; and in response to determining that the threshold amount has not been reached, the one node forbearing from reporting the change in its status to the network call router until such time as the threshold amount of change in its status is reached.

11. The method of claim 10 wherein:
the change in status comprises an occurrence of any one of a plurality of events that affect whether or not the call router routes a call to the one node.

12. An apparatus for updating node status information of a call router that routes calls to ones of plurality of call processing nodes, comprising:

means in a call processing node for sending to the call router status-update messages and not the calls to affect the call router's routing of the calls to the ones of the nodes;

means in the node for detecting a change in status of said node;

means in the node, responsive to detection of the change in the status, for determining whether the change in the status of said node since a last time that a change in the status of said node has been reported to the call router has reached a threshold amount; wherein the sending nodes respond to determination that the threshold amount has been reached by sending one of said status-update messages reporting the change in the status of said node to the call value and a value of the status of the one node last reported to the call router, and respond to a determination that the threshold amount has not been reached by forbearing from reporting the change in the status of said node to the call router until such time as the threshold amount of change the status of said node is reached.

13. The apparatus of claim 12 wherein:
the change in status comprises an occurrence of any one of a plurality of events that affect whether or not the call router routes a call to the node.

14. A communications network comprising:

a network call router that routes each call through the network to one of a plurality of call processing nodes exclusive of the network call router, without intermediary of another one of the plurality of nodes;

said plurality of call processing nodes, each said node responsive to receipt of the call routed thereto by processing said received call at said node, the nodes communicating with the network call router by sending status-update messages and not the calls to the network call router to effect the network call router's routing of the calls to the nodes;

means in one of the nodes for detecting a change in status of said node;

means in the one node, responsive to detection of the change in the status, for determining whether the change in the status of said node since a last time that a change in the status of said node has been reported to the network call router has reached a threshold amount;

means in the one node, responsive to a determination that the threshold amount has been reached for sending one of said status-update messages reporting the change in the status of said node to the network call router, and responsive to a determination that the threshold amount has not been reached for forbearing from reporting the change in the status of said node to the network call router until such time as the threshold amount of change in the status of said node is reached.

15. The network of claim 14 wherein
the change in status comprises an occurrence of any one of a plurality of events that affect whether or not the call router routes a call to the one node.

\* \* \* \* \*